United States Patent
Wilson (10) Patent No.: US 12,241,497 B2
(45) Date of Patent: Mar. 4, 2025

(54) CHALK BOX WITH IMPROVED END HOOK GRIP

(71) Applicant: APEX BRANDS, INC., Apex, NC (US)

(72) Inventor: Cecil Wilson, Sandford, NC (US)

(73) Assignee: APEX BRANDS, INC., Apex, NC (US)

( * ) Notice: Subject to any disclaimer, the term of this patent is extended or adjusted under 35 U.S.C. 154(b) by 483 days.

(21) Appl. No.: 17/618,934

(22) PCT Filed: Jun. 11, 2020

(86) PCT No.: PCT/US2020/037179
§ 371 (c)(1),
(2) Date: Dec. 14, 2021

(87) PCT Pub. No.: WO2020/257040
PCT Pub. Date: Dec. 24, 2020

(65) Prior Publication Data
US 2022/0316520 A1    Oct. 6, 2022

Related U.S. Application Data (60) Provisional application No. 62/862,225, filed on Jun. 17, 2019.

(51) Int. Cl.
*B44D 3/38* (2006.01)
*F16B 45/00* (2006.01)

(52) U.S. Cl.
CPC ............... *F16B 45/00* (2013.01); *B44D 3/38* (2013.01)

(58) Field of Classification Search
CPC .................. F16B 45/00; B44D 3/38
See application file for complete search history.

(56) References Cited

U.S. PATENT DOCUMENTS 2,866,269 A * 12/1958 Laub .................. E04G 21/1825
33/409
6,082,014 A *  7/2000 Beyers ..................... B44D 3/38
33/413

(Continued)

FOREIGN PATENT DOCUMENTS

EP    1408300 A1 *  4/2004  ........... G01B 3/1056

OTHER PUBLICATIONS

First Examination Report issued in corresponding Australian Application No. 2020298073 on Nov. 17, 2022, all pages cited in their entirety.

(Continued)

*Primary Examiner* — Yaritza Guadalupe-McCall
(74) *Attorney, Agent, or Firm* — BURR & FORMAN LLP (57) ABSTRACT

An end hook may include a stem portion extending in a first plane from a proximal end to a distal end and an engaging portion. The end hook may be operably coupled to the measuring device at the proximal end. The engaging portion may be defined by a set of teeth having external lateral edges that define a hook width therebetween. The engaging portion may extend away from the stem portion by an engaging length. Each of the teeth may include a portion thereof that extends away from the distal end of the stem portion in a second plane that is substantially perpendicular to the first plane. Each of the teeth may further include a portion thereof, proximate to a distal end of the teeth, that bends out of the second plane to form an engaging angle. The hook width may be in a range between about 16.5 mm and about 21 mm, and the engaging angle may be greater than about 45 degrees.

18 Claims, 8 Drawing Sheets

(56) References Cited

U.S. PATENT DOCUMENTS

| | | | | |
|---|---|---|---|---|
| 7,913,408 | B2* | 3/2011 | Grisham | B44D 3/38 33/1 LE |
| 8,819,950 | B1* | 9/2014 | Lemcke | F16B 45/00 33/413 |
| D753,000 | S * | 4/2016 | DeLeo | D10/72 |
| 9,701,154 | B2* | 7/2017 | Parker | B44D 3/38 |
| 9,815,320 | B2* | 11/2017 | Khangar | B44D 3/38 |
| 10,245,881 | B2* | 4/2019 | Khangar | B44D 3/38 |
| D926,009 | S * | 7/2021 | Wilson | D10/74 |
| 2007/0294901 | A1 | 12/2007 | Spaulding | |
| 2009/0277027 | A1* | 11/2009 | Grisham | B44D 3/38 24/588.1 |
| 2016/0023507 | A1* | 1/2016 | Douglas | B44D 3/38 33/414 |
| 2016/0096396 | A1 | 4/2016 | Khangar et al. | |
| 2016/0347117 | A1* | 12/2016 | Parker | B44D 3/38 |
| 2018/0065404 | A1* | 3/2018 | Khangar | B44D 3/38 |
| 2019/0009610 | A1* | 1/2019 | Papp | G01B 3/1056 |
| 2020/0070568 | A1* | 3/2020 | Fox | B44D 3/38 |
| 2022/0316520 | A1* | 10/2022 | Wilson | B44D 3/38 |

OTHER PUBLICATIONS

Third Office Action issued in corresponding Chinese Application No. 202080044206.8 on Oct. 24, 2022, all pages cited in their entirety.

Second Examination Report issued in corresponding Australian Application No. 2020298073 on Oct. 18, 2023, all pages cited in their entirety.

First Office Action issued in corresponding Chinese Application No. 202080044206.8 on Mar. 2, 2022, all pages cited in their entirety.

Second Office Action issued in corresponding Chinese Application No. 202080044206.8 on Jul. 29, 2022, all pages cited in their entirety.

International Search Report and Written Opinion from International Application No. PCT/US2020/037179 mailed Sep. 16, 2020, all pages cited in its entirety.

\* cited by examiner

End hook 170

| sample | Push Force D1 (lbf) | Push Force D2 (lbf) |
|---|---|---|
| 1 | 1.24 | 1.26 |
| 2 | 1.5 | 1.46 |
| 3 | 1.5 | 1.26 |
| 4 | 1.22 | 1.66 |
| 5 | 1.2 | 1.5 |
| Avg | 1.332 | 1.428 |

Table A

Competitor 1

| sample | Push Force D1 (lbf) | Push Force D2 (lbf) |
|---|---|---|
| 1 | 1.4 | 0.52 |
| 2 | 1.1 | 0.54 |
| 3 | 1.2 | 0.44 |
| 4 | 1.14 | 0.42 |
| 5 | 1.14 | 0.44 |
| Avg | 1.196 | 0.472 |

Table B

Competitor 2

| sample | Push Force D1 (lbf) | Push Force D2 (lbf) |
|---|---|---|
| 1 | 0.7 | 0.2 |
| 2 | 0.7 | 0.14 |
| 3 | 0.7 | 0.18 |
| 4 | 0.68 | 0.2 |
| 5 | 0.6 | 0.18 |
| Avg | 0.676 | 0.18 |

Table C

Competitor 3

| sample | Push Force D1 (lbf) | Push Force D2 (lbf) |
|---|---|---|
| 1 | 0.88 | 0.26 |
| 2 | 0.66 | 0.2 |
| 3 | 0.4 | 0.18 |
| 4 | 0.86 | 0.2 |
| 5 | 0.8 | 0.18 |
| Avg | 0.72 | 0.204 |

Table D

Competitor 4

| sample | Push Force D1 (lbf) | Push Force D2 (lbf) |
|---|---|---|
| 1 | 0.74 | 1.56 |
| 2 | 0.74 | 1.1 |
| 3 | 0.74 | 1.42 |
| 4 | 0.96 | 1.48 |
| 5 | 0.92 | 1.6 |
| Avg | 0.82 | 1.432 |

Table E

| | Average Slide Force (lb) | Average Push Force (lb) | Average Grip Force (lb) |
|---|---|---|---|
| End hook 170 | 1.33 | 1.43 | 1.38 |
| Competitor 1 | 1.20 | 0.47 | 0.83 |
| Competitor 2 | 0.68 | 0.18 | 0.43 |
| Competitor 3 | 0.72 | 0.20 | 0.46 |
| Competitor 4 | 0.82 | 1.43 | 1.13 |

Table F

FIG. 7.

CHALK BOX WITH IMPROVED END HOOK GRIP

TECHNICAL FIELD

Example embodiments generally relate to a chalk box or chalk reel, and more particularly relate to a chalk box or chalk reel having an improved end hook grip.

BACKGROUND

A chalk box (sometimes referred to as a chalk reel or chalk line tool) is a tool for marking straight lines on surfaces. To accomplish this, the chalk box typically includes a string or line that may be made of nylon, cotton or other materials and is able to be wound or spooled up onto a reel assembly. The string is exposed to chalk (or another marking substance) within the tool. The string typically has an end hook at one end, and the end hook extends from a body of the tool. The end hook can be pulled, thereby extracting string from the reel assembly, to place the end hook at a first point that is distant from a second point near which the remainder of the tool will be retained. Alternatively, the end hook could be affixed to the first point and the remainder of the tool can be moved to the second point while withdrawing string from the reel assembly. In either case, the end hook retains the string at the first point, and the user may pull the string relatively tightly to the second point (e.g., holding the string at the second point with the user's hand or thumb). The user may then pluck or snap the string sharply, and the chalk may be transferred to the surface to mark a straight line between the first and second points. The marked line is often referred to as a chalk line and, after its formation, the user often operates a rotatable handle that is operably coupled to the reel assembly to retract the string back onto the reel or drum thereof.

The process described above, and the tool adapted for performing the process, are both very old. However, equally old in relation to this tool, is the fact that the conventional design tends to employ a simple end hook having a 90 degree bend between two perpendicular portions thereof. This type of end hook, although simple to manufacture and easy to employ, does not provide for good grip strength on some surfaces. Some design improvements over the years led to the distal ends of the end hook being split into two forks, and further improvements led to the bending of the distal ends of the two forks. However, although these simple design improvements have been copied over and over again within the industry, there has never been any apparent effort to optimize the design relative to grip strength. In particular, it has never been recognized within the industry that optimization of specific design parameters within this general design can drastically improve the performance of the design.

Given that chalk boxes are desirable for use on multiple different media or types of surface materials, it is important that the end hook not slip off the end of the media or material before the chalk line can be formed (or particularly when the line is extracted for plucking). Thus, it is important to provide an end hook that provides improved grip characteristics that can apply to any of a number of different use cases.

BRIEF SUMMARY OF SOME EXAMPLES

Some example embodiments may enable the provision of a chalk box that has an improved end hook design, which enables the end hook to more securely grip surfaces.

In an example embodiment, a chalk box (also known as a chalk reel or chalk line tool) is provided. The chalk box may include a housing having an aperture, a reel assembly enclosed within the housing, a string having a first end operably coupled to an end hook and configured to extend from the housing through the aperture and having a second end configured to be wound on the reel assembly, and a chalk reservoir in which the string is retained or through which the string passes prior to extending out of the aperture. The end hook may include a stem portion extending in a first plane from a proximal end to a distal end and an engaging portion. The engaging portion may be defined by a set of teeth having external lateral edges that define a hook width therebetween. The engaging portion may extend away from the stem portion by an engaging length. Each of the teeth may include a portion thereof that extends away from the distal end of the stem portion in a second plane that is substantially perpendicular to the first plane. Each of the teeth may further include a portion thereof, proximate to a distal end of the teeth, that bends out of the second plane to form an engaging angle. In some cases, each of the teeth tapers to the distal end from a point at which the teeth bend out of the second plane to define a tooth angle between respective tapered edges. A tooth radius may be defined from an apex of the distal end of the teeth to the point at which the teeth bend out of the second plane. The hook width may be in a range between about 16.5 mm and about 21 mm, and the tooth radius may be less than about 1.4 mm. As an alternative or in addition to the tooth radius being less than about 1.4 mm, the engaging angle may be greater than about 45 degrees.

In another example embodiment, an end hook of a measuring device is provided. The end hook may include a stem portion extending in a first plane from a proximal end to a distal end and an engaging portion. The end hook may be operably coupled to the measuring device at the proximal end. The engaging portion may be defined by a set of teeth having external lateral edges that define a hook width therebetween. The engaging portion may extend away from the stem portion by an engaging length. Each of the teeth may include a portion thereof that extends away from the distal end of the stem portion in a second plane that is substantially perpendicular to the first plane. Each of the teeth may further include a portion thereof, proximate to a distal end of the teeth, that bends out of the second plane to form an engaging angle. In some cases, each of the teeth tapers to the distal end from a point at which the teeth bend out of the second plane to define a tooth angle between respective tapered edges. A tooth radius may be defined from an apex of the distal end of the teeth to the point at which the teeth bend out of the second plane. The hook width may be in a range between about 16.5 mm and about 21 mm, and the tooth radius may be less than about 1.4 mm. As an alternative or in addition to the tooth radius being less than about 1.4 mm, the engaging angle may be greater than about 45 degrees.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Figure 1:
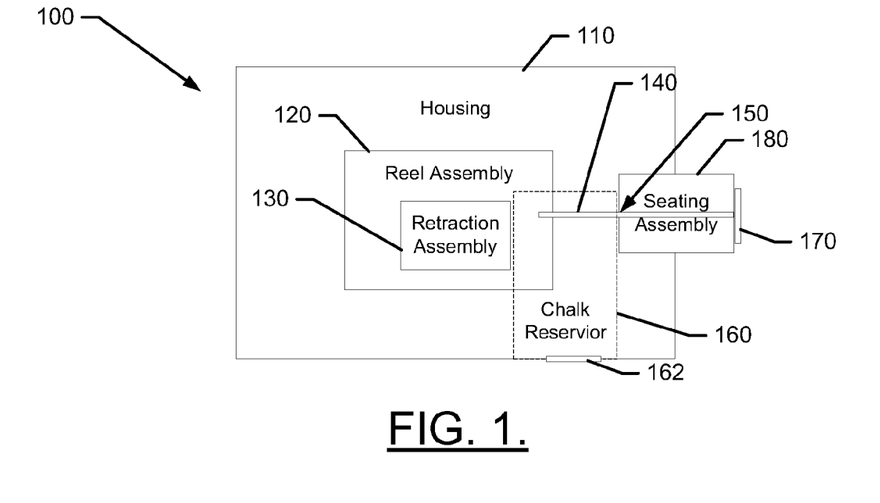
FIG. 1 illustrates a block diagram of a chalk box in accordance with an example embodiment.
Figure 2:
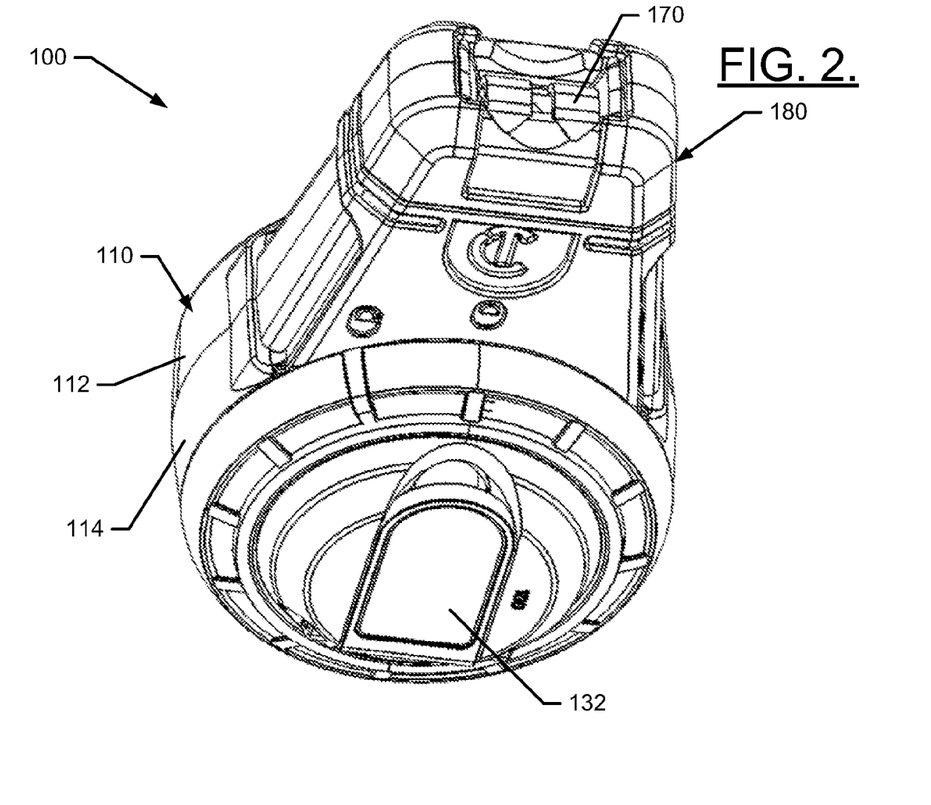
FIG. 2 illustrates a front perspective view of the chalk box in accordance with an example embodiment.
Figure 3:
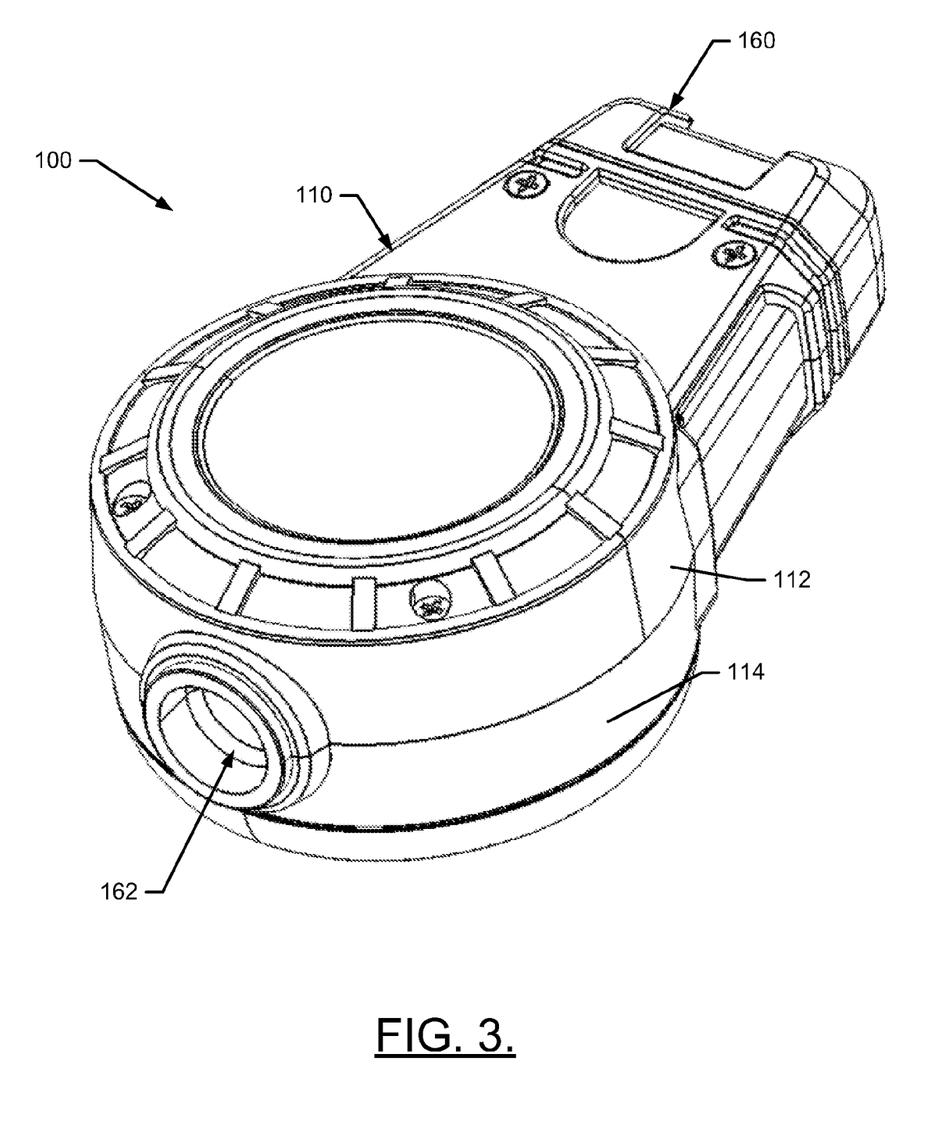
FIG. 3 illustrates a rear perspective view of the chalk box in accordance with an example embodiment.
Figure 4:
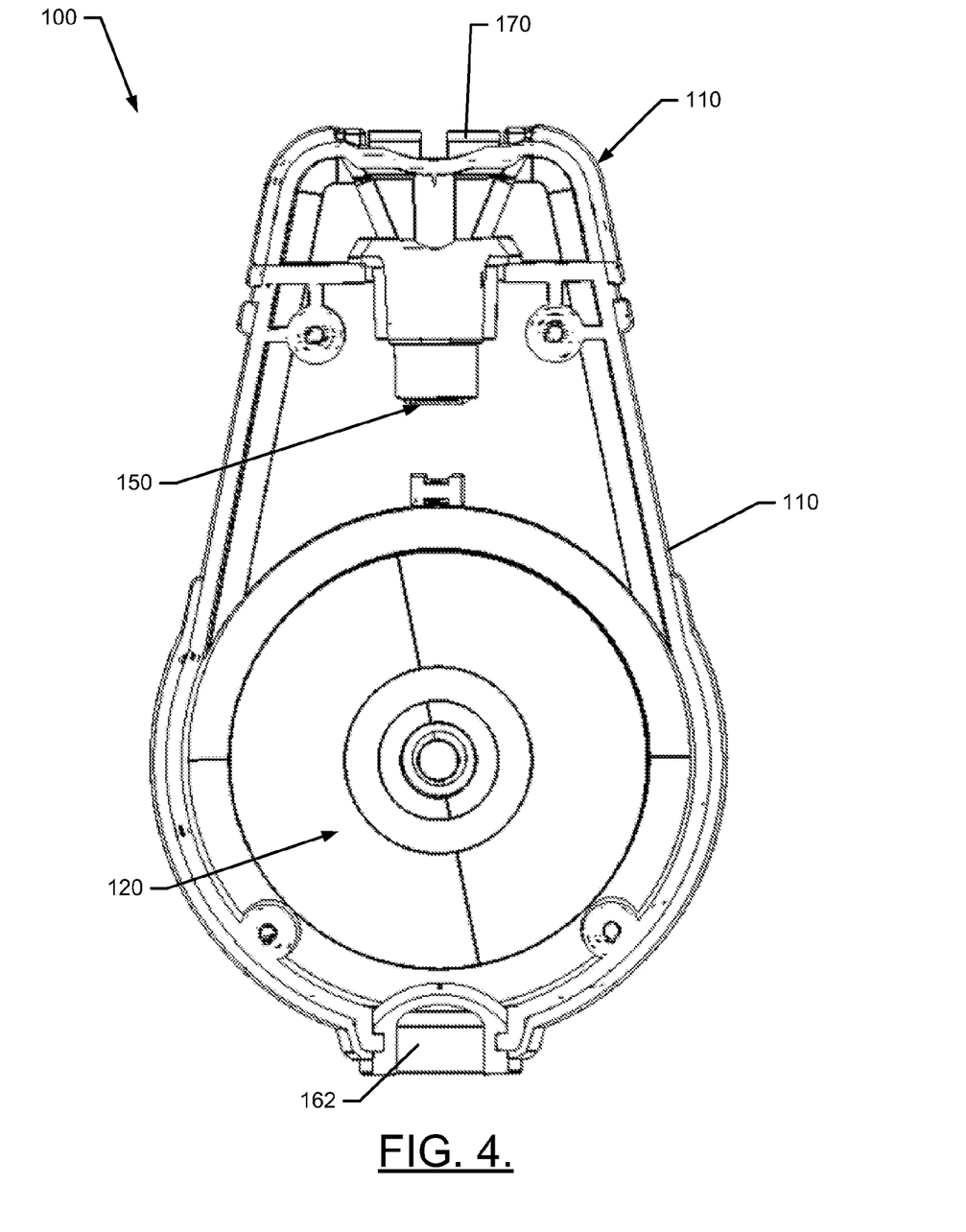
FIG. 4 illustrates a cross section view taken along a plane passing through the intersection between case halves of the chalk box in accordance with an example embodiment.
Figure 5:
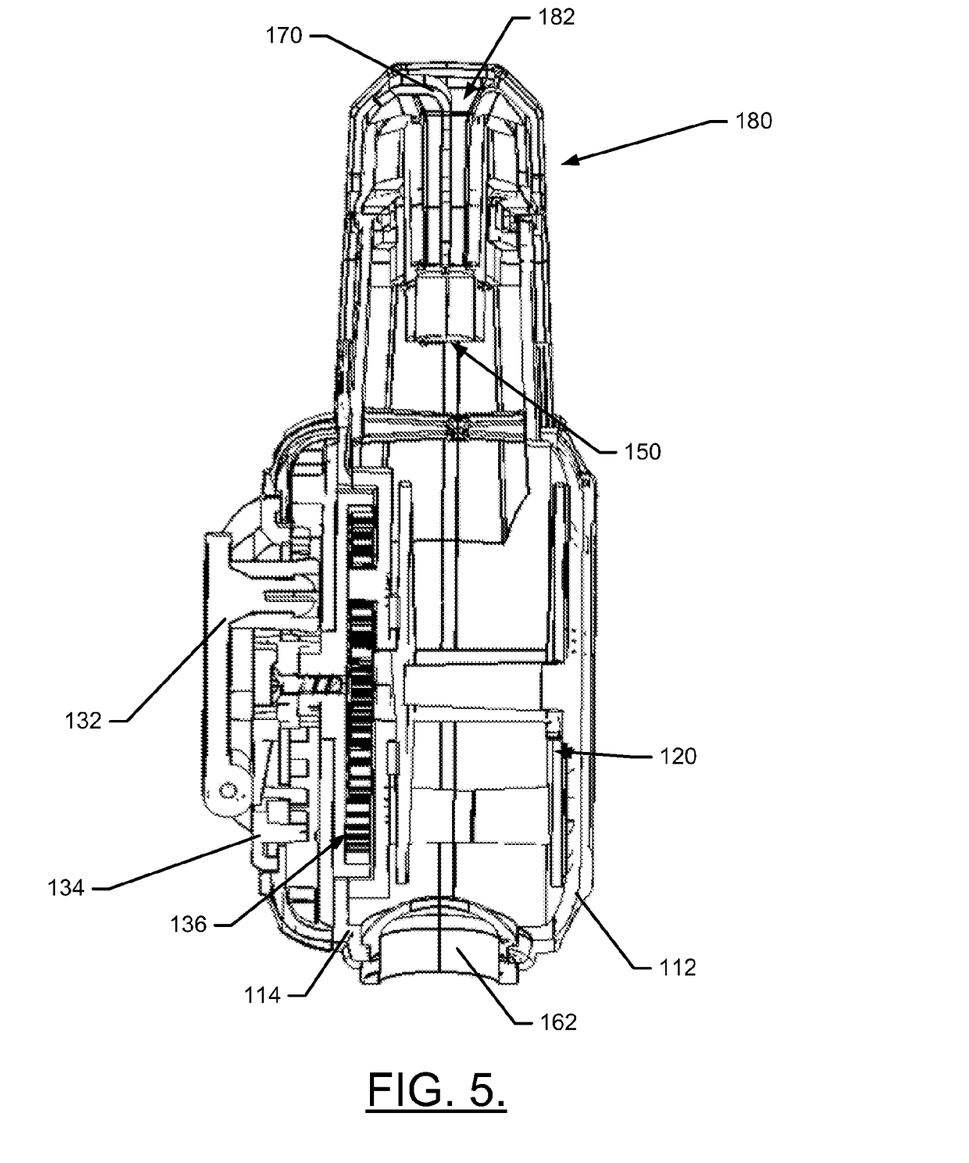
FIG. 5 is a cross section view taken along a longitudinal centerline of the chalk box via a plane that is perpendicular to the plane mentioned above in reference to FIG. 4 in accordance with an example embodiment.
Figures 6A, 6B:
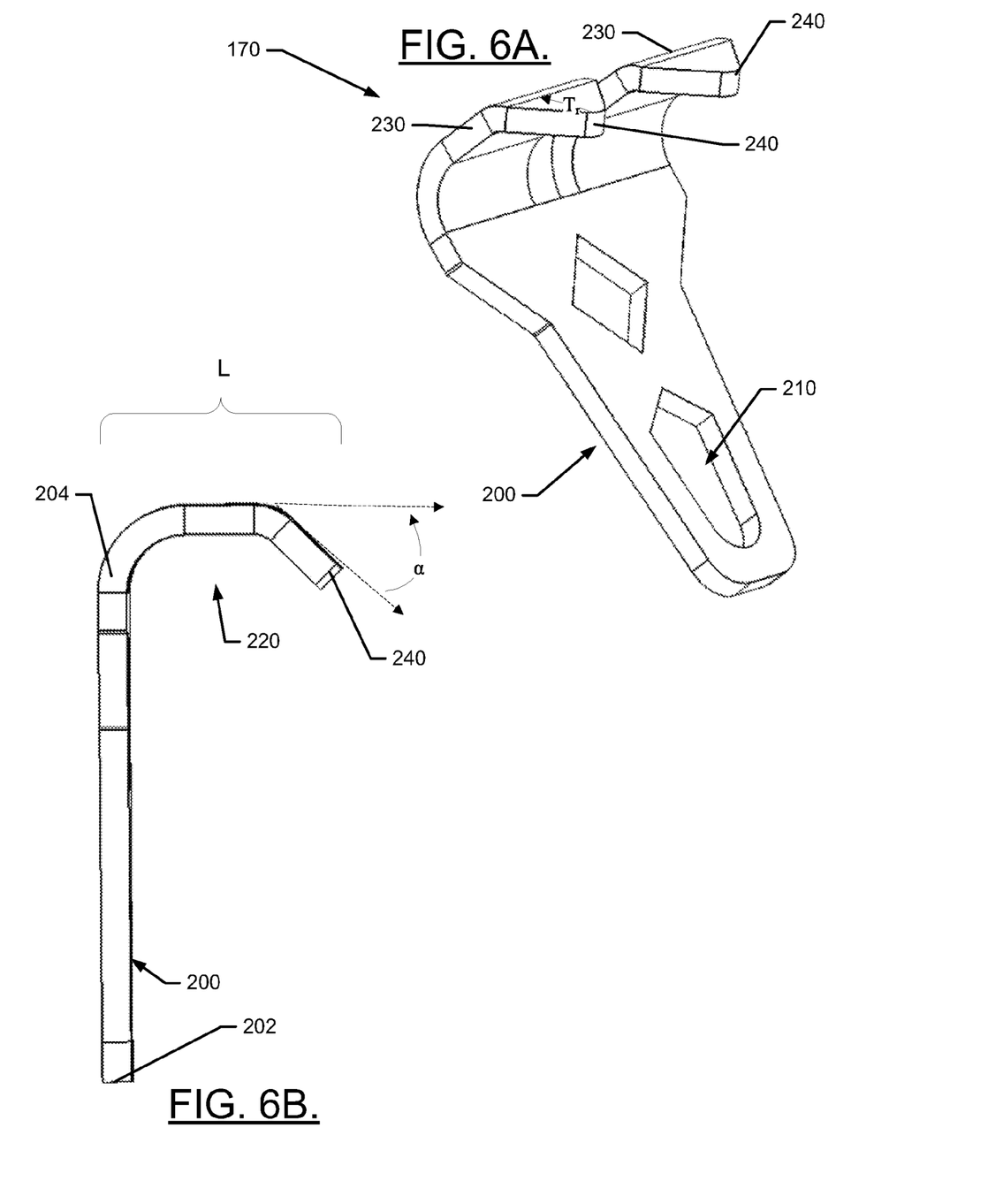
FIG. 6A is a perspective isolation view of an end hook in accordance with an example embodiment.
FIG. 6B is a side view of the end hook in accordance with an example embodiment.
Figure 6C:
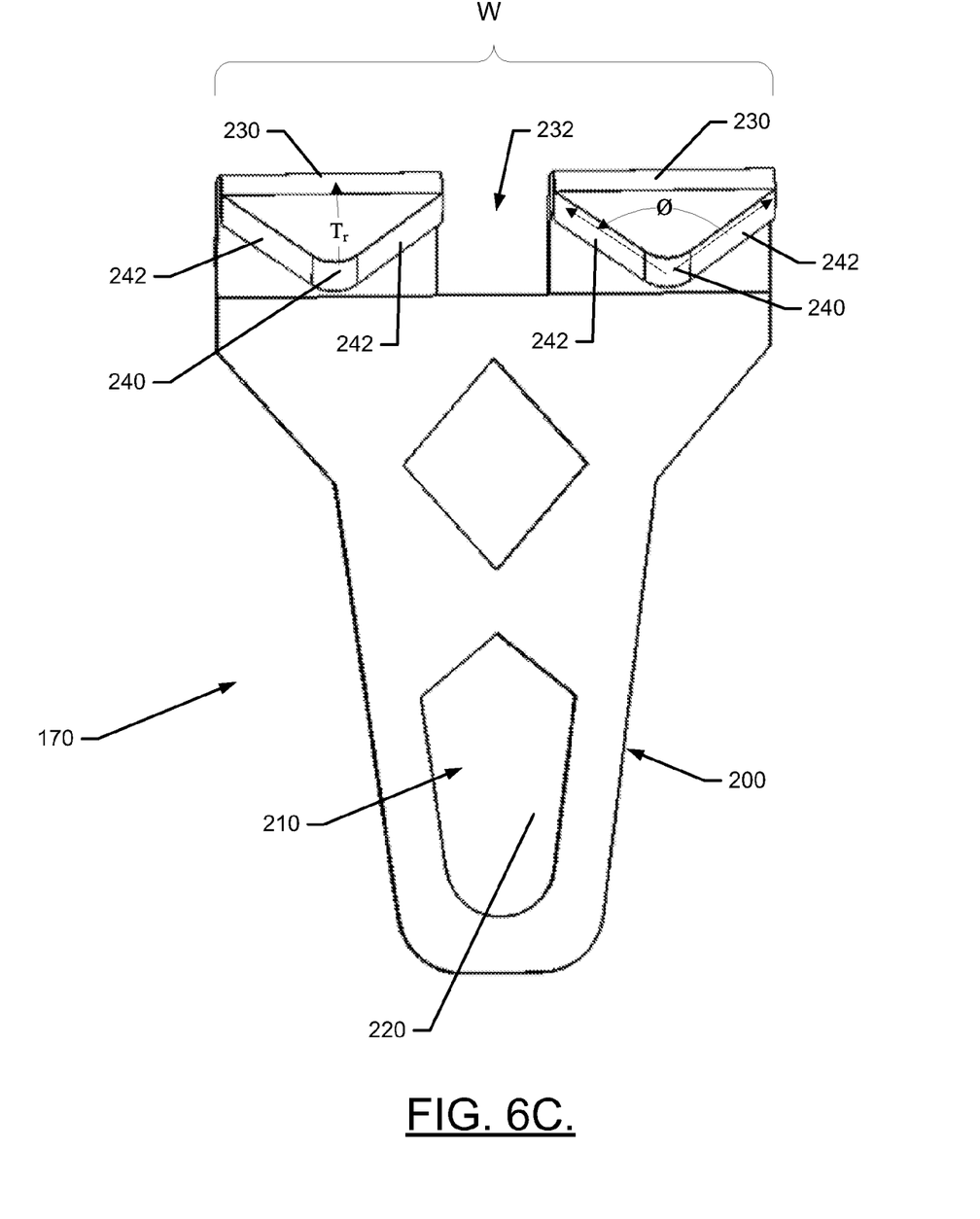
FIG. 6C is a front view of the end hook in accordance with an example embodiment.
Figure 6D:
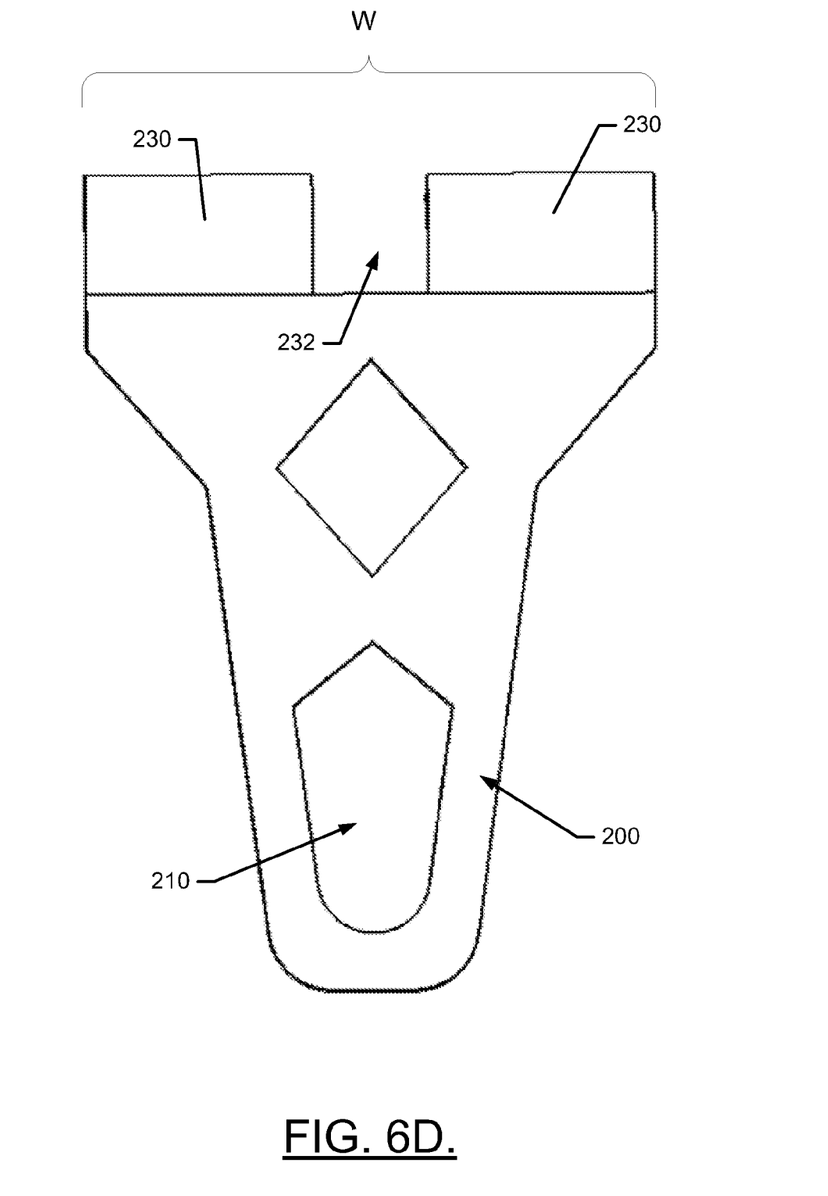
FIG. 6D is a rear view of the end hook in accordance with an example embodiment.

As indicated above, some example embodiments may relate to the provision of a chalk box that may have an improved end hook design for better grip strength. This may be accomplished by providing an end hook geometry as described herein. FIG. 1 illustrates a block diagram of a chalk box 100 in accordance with an example embodiment, and FIGS. 2 and 3 illustrate front and rear perspective views, respectively, of the chalk box. FIG. 4 illustrates a cross section view taken along a plane passing through the intersection between case halves of the chalk box. FIG. 5 is a cross section view taken along a longitudinal centerline of the chalk box via a plane that is perpendicular to the plane mentioned above in reference to FIG. 4. FIG. 6, which is defined by FIGS. 6A, 6B, 6C and 6D, illustrates various views of an end hook designed in accordance with an example embodiment.

Of note, although FIGS. 2-5 illustrate a particular chalk box design that may work well with example end hook designs, it should be appreciated that the end hook design described herein can also be employed with any of a number of other chalk box designs. Thus, the chalk box design shown in FIGS. 2-5 is merely provided as an example to facilitate description of the operation of a chalk box generally, and to show how the end hook design described herein can also be advantageously employed in one example chalk box design.

Referring now to FIGS. 1-6, a chalk box 100 of an example embodiment may include a housing 110 comprising a first case half 112 and a second case half 114. The first and second case halves 112 and 114 may house a reel assembly 120 and a retraction assembly 130 therein. A string 140 (or line) may be wound onto the reel assembly 120 and may be alternately withdrawn from and retracted back onto the reel assembly 120. The retraction back onto the reel assembly 120 may be accomplished via the retraction assembly 130, which may include a foldable handle 132 that is folded in to nest into a portion of the second case half 114, and folded out in order to enable the user to turn the handle 132. When the handle 132 is folded out and turned, a hub 134 rotates and is operably coupled to a gear assembly (see gear assembly 136 of FIG. 5) that may provide multiple rotations of a drum or reel of the reel assembly 120 for each respective rotation of the handle 132.

The string 140 may be paid out through an aperture 150 formed in a portion of the housing 110. The aperture 150 may be formed to be slightly larger than a diameter of the string 140, and may further house or retain a filter or wiping member, such as a piece of felt or other material that prevents excess escape of chalk from a chalk reservoir 160 that is exposed to the string 140 while the string 140 is inside the housing 110, and also removes excess chalk from the string 140 as the string 140 is withdrawn from the housing 110. The felt may be held in place by a retaining wire or other structure. The string 140 may therefore pass through or be retained in the chalk reservoir 160 before passing out the aperture 150. In an example embodiment, the chalk reservoir 160 may include a plug 162 that is accessible from outside the housing 110 to be removed to enable refilling of the chalk reservoir 160. The plug 162 of this example is located at a bottom portion of the housing 110, but other locations for the plug 162 are also possible.

The string 140 has an end hook 170 disposed at one end thereof, and is affixed to the reel assembly 120 at the other end of the string 140. The end hook 170 may be affixed (temporarily) to an anchor point on a medium or surface that is to be marked. Once the end hook 170 is affixed to the anchor point, the string 140 may be paid out of the aperture 150 and unwound from the reel assembly 120. When a desired length of the string 140 has been paid out, the user can make any necessary markings by snapping or plucking the string 140 as described above. The end hook 170 may then be released from the anchor point, and the handle 132 may be used to operate the retraction assembly 130 to wind the string 140 back onto the reel assembly 120 by drawing the string 140 back into the housing 110 via the aperture 150.

Although the end hook 170 may dangle from the housing 110 near the aperture 150, some example embodiments may employ a seating assembly 180, which may be formed as a mouth or nozzle that includes a reception cavity 182 that is formed therein to allow the end hook 170 to be withdrawn into the reception cavity 182. When the end hook 170 is withdrawn into the reception cavity 182, the end hook 170 may be seated flush with the distal end (relative to the remainder of the housing 110) of the seating assembly 180. In other words, the end hook 170 is fully seated in a portion of the housing 110 (specifically in the reception cavity 182 of the seating assembly 180) such that substantially all of the body, back, base or spine of the end hook 170 is received or surrounded by the reception cavity 182 and only the teeth or prongs (which extend at about a 90 degree angle to the body, back, base or spine) are outside the reception cavity 182. This arrangement, if employed, may ensure that the end hook 170 cannot be inadvertently snagged or caught on objects, clothing and/or the like, but also creates a sleek and aesthetically pleasing appearance.

Referring to FIG. 6, some general characteristics of the end hook 170 of an example embodiment will be discussed. In this regard, the end hook 170 may include a stem portion 200 to which the string 140 is attached. In particular, the stem portion 200 may be a flat piece of sheet metal (e.g., about 1.3 mm thick) that tapers toward a proximal end 202 thereof (the proximal end being considered with respect to the connection of the end hook 170 to the string 140). The stem portion 200 may include a reception cavity 210 through which the string 140 can be fed to facilitate attachment of the string 140 to the end hook 170.

The stem portion 200 may extend in a first plane from the proximal end 202 to a distal end 204 thereof. At the distal end 204 of the stem portion 200, the end hook 170 may include a transition (e.g., a bend) to an engaging portion 220. The engaging portion 220 may be defined by two teeth 230 that are spaced apart from each other by an inter-tooth gap 232. The teeth 230 may extend away from the distal end 204 of the stem portion 200 in a direction that is substantially perpendicular to the first plane in which the stem portion 200 lies. As such, the teeth 230 may extend (at least initially and proximate to the transition between the engaging portion 220 and the stem portion 200) in a second plane that is substantially perpendicular to the first plane.

The transition between the engaging portion 220 and the stem portion 200 may occur at the distal end 204 of the stem portion 200 and a proximal end (relative to the stem portion 200) of the teeth 230. Meanwhile, the teeth 230 may each extend toward their respective distal ends 240 where two simultaneous transitions occur. In this regard, each of the teeth 230 will be bent out of the second plane (and generally back toward the first plane) and also, from about the point at which the bending is initiated taper in width until reaching the distal end 240 at a point. The amount of bend out of the second plane may be referred to as an engaging angle ($\alpha$).

As noted above, there has never been any apparent effort to optimize the features of end hooks within the industry relative to grip strength. However, in designing example embodiments, a number of ranges of variables have been identified for certain parameters that actually result in marked improvements in the grip strength of the end hook 170. The ranges that have been found to optimize the grip strength of the end hook 170 will now be described in detail, and followed by a demonstration of test results that illustrate the result-effective nature of these previously unknown parametric ranges.

Hook width (W) may be measured between opposite lateral edges of each of the teeth 230. Hook width (W) is one of the variables that has been found to be, in combination with some of the others described hereinafter, capable of being optimized for improving grip strength. In this regard, a hook width (W) range of between about 16.5 mm and 21 mm has been shown to be an optimal when combined with an engaging angle ($\alpha$) of less than about 45 degrees or a tooth radius ($T_r$) of less than about 1.4 mm. The tooth radius ($T_r$) may be measured from the distal end 232 of the teeth 230 to the point at which the bending is initiated out of the second plane. Another dimension that can positively impact the grip strength of the end hook 170 in combination with either or both of the engaging angle ($\alpha$) and tooth radius ($T_r$) dimensions described above may be the engaging length (L) of the teeth 230. The engaging length (L) may measure the full length of the teeth 230 as the teeth 230 extend away from the first plane. In an example embodiment, the engaging length (L) may be selected to be greater than about 9 mm.

As can be appreciated from FIG. 6, the distal end 240 of the teeth 230 may taper to a point. Thus, an angle may be defined (i.e., a tooth angle (Ø)) between the lateral edges 242 of the distal end 240 of the teeth 230 as the lateral edges 242 extend away from the distal end 240. In an example embodiment, the tooth angle (Ø) may be selected to be about 90 degrees, or in a range between 80 and 100 degrees.

Figure 7:
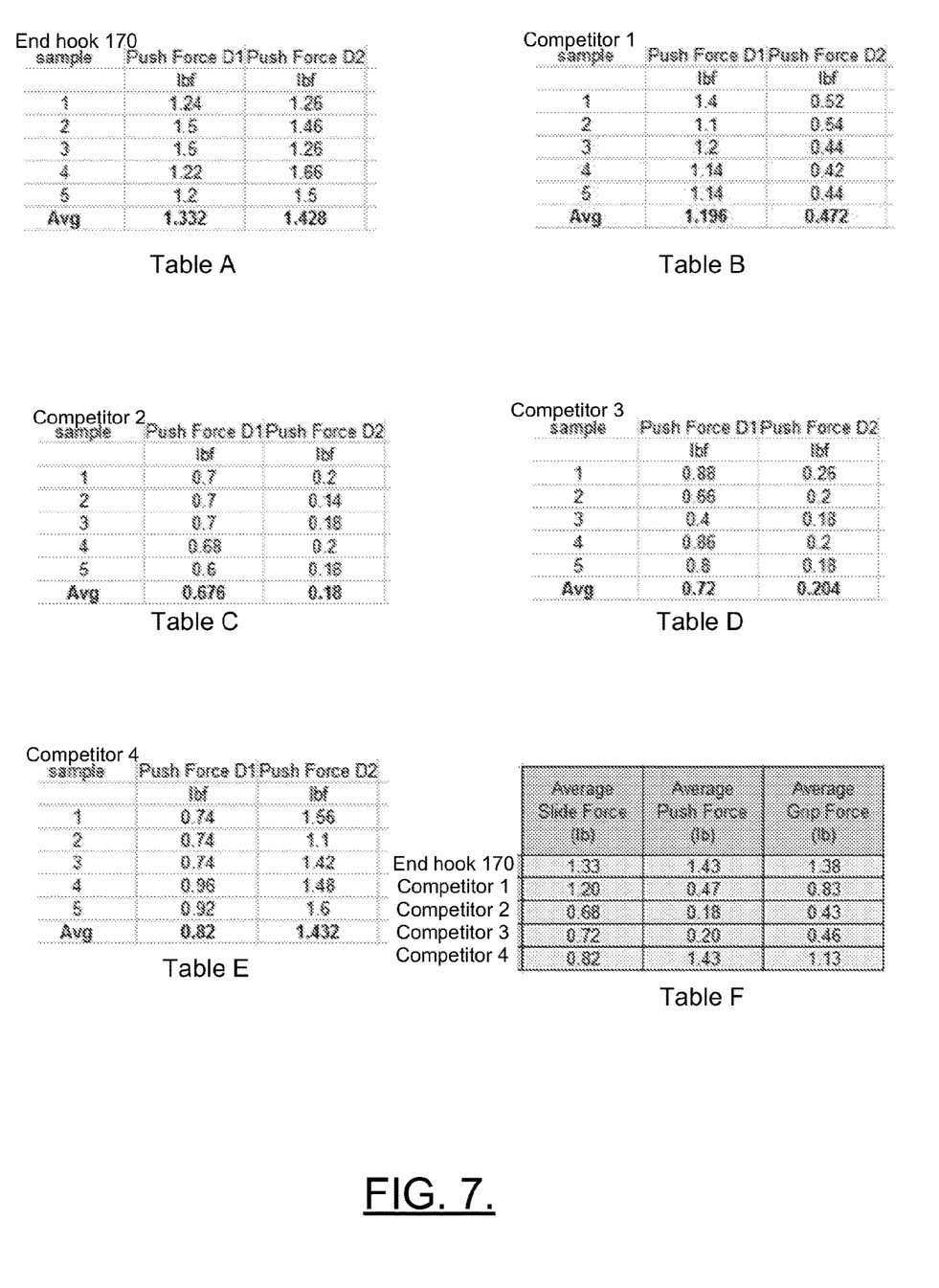
FIG. 7 illustrates a series of tables of test data and corresponding results.

Test results have shown that selecting the geometry and dimensions described above can provide a greater than 90% increase in average grip force relative to the grip force exerted by other end hooks. FIG. 7, which is defined by Tables A, B, C, D, E and F, shows data gathered responsive to measuring various forces during performance testing of various samples respective different end hook designs. In this regard, the performance of an example embodiment (i.e., end hook 170) is shown in Table A. The measurements taken during identical performance testing of four competitor end hooks are shown in Tables, B, C, D and E, respectively. Table F shows a comparison of all of the averages of the respective end hooks.

Of note, the test rig was identical for each set of measurements and included a string of standard length and a standard weight at a distal end of the string. The end hook being tested was then attached to the edge of a vertically oriented surface (actually a board held in a vice) to suspend the standard weight via the string. A force gage was then employed to push on the end hook in two directions and measure the force needed to move the end hook in each respective direction. The push force D1 is the push force measured (using the force gage) when displacing the end hook in a direction that is parallel to the first plane (and therefore also parallel to the surface of the board). The push force D1 is therefore the force needed to push the end hook so that it slides along the vertically oriented surface (i.e., not pushing the end hook off or away from the surface). Meanwhile, the push force D2 is the push force measured (using the force gage) when displacing the end hook in a direction that is perpendicular to the first plane (and therefore also perpendicular to the surface of the board). The push force D2 is therefore the force needed to push the end hook so that it slides away from the vertically oriented surface (i.e., pushing the end hook off or away from the surface).

Five sample measurements are shown for the end hook 170 of an example embodiment in Table A. Five sample measurements are shown for an end hook of competitor 1 in Table B.

Five sample measurements are shown for an end hook of competitor 2 in Table C. Five sample measurements are shown for an end hook of competitor 3 in Table D. Five sample measurements are shown for an end hook of competitor 4 in Table E. Then, table F shows the average slide force (i.e., the average of the five push force D1 measurements) along with the average push force (i.e., the average of the five push force D2 measurements) for each respective end hook. An average of the slide force and push force is then calculated and shown as the average "grip force" for each respective end hook. As can be appreciated from the data shown, the end hook 170 of an example embodiment (i.e., employing dimensions within the optimized ranges described herein—specifically, end hook width (W) of 17.5 mm, tooth radius of 1 mm, an engaging angle of 45 degrees and an engaging length of 10.7 mm) has an average grip force of 1.38 (lb). Meanwhile, the average grip force of the four competitor end hooks is 0.71 (lb), resulting in a 94% grip force improvement over the average performance of all competitor designs.

In an example embodiment, a chalk box is provided. The chalk box may include a housing having an aperture, a reel assembly enclosed within the housing, a string having a first end operably coupled to an end hook and configured to extend from the housing through the aperture and having a second end configured to be wound on the reel assembly, a chalk reservoir in which the string is retained or through which the string passes prior to extending out of the aperture, and an end hook of an example embodiment.

The end hook (of the chalk box, or another measuring device—for measuring and/or marking a straight line) may include a stem portion extending in a first plane from a proximal end to a distal end and an engaging portion. The end hook may be operably coupled to the measuring device at the proximal end (e.g., by a string). The engaging portion may be defined by a set of teeth having external lateral edges that define a hook width therebetween. The engaging portion may extend away from the stem portion by an engaging length. Each of the teeth may include a portion thereof that extends away from the distal end of the stem portion in a second plane that is substantially perpendicular to the first plane. Each of the teeth may further include a portion thereof, proximate to a distal end of the teeth, that bends out of the second plane to form an engaging angle. In some cases, each of the teeth tapers to the distal end from a point at which the teeth bend out of the second plane to define a tooth angle between respective tapered edges. A tooth radius may be defined from an apex of the distal end of the teeth to the point at which the teeth bend out of the second plane. The hook width may be in a range between about 16.5 mm and about 21 mm, and the tooth radius may be less than about 1.4 mm. As an alternative or in addition to the tooth radius being less than about 1.4 mm, the engaging angle may be greater than about 45 degrees.

In some embodiments, the features of the device described above may be augmented or modified, or additional features may be added. These augmentations, modifications and additions may be optional and may be provided in any combination. Thus, although some example modifications, augmentations and additions are listed below, it should be appreciated that any of the modifications, augmentations and additions could be implemented individually or in combination with one or more, or even all of the other modifications, augmentations and additions that are listed. As such, for example, the engaging length may be greater than about 9 mm. In an example embodiment, the tooth angle may be between about 80 degrees and about 100 degrees. In some cases, a gap between the teeth may be between about 3 mm and about 4 mm. In an example embodiment, a length of the stem portion may be at least two times the engaging length. In some cases, the measuring device may be a chalk box and the end hook may be operably coupled to the chalk box via a string.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. An end hook for a measuring device, the end hook comprising:
   a stem portion extending in a first plane from a proximal end to a distal end, the end hook being operably coupled to the measuring device at the proximal end; and
   an engaging portion defined by a set of teeth having external lateral edges that define a hook width therebetween, the engaging portion extending away from the stem portion by an engaging length,
   wherein each of the teeth includes a portion thereof that extends away from the distal end of the stem portion in a second plane that is substantially perpendicular to the first plane,
   wherein each of the teeth further includes a portion thereof, proximate to a distal end of the teeth, that bends out of the second plane to form an engaging angle, and
   wherein the hook width is in a range between about 16.5 mm and about 21 mm, and the engaging angle is about 45 degrees.

2. The end hook of claim 1, wherein the engaging length is greater than about 9 mm.

3. The end hook of claim 2, wherein each of the teeth tapers to the distal end from a point at which the teeth bend out of the second plane to define a tooth angle between respective tapered edges.

4. The end hook of claim 3, wherein a tooth radius is defined from an apex of the distal end of the teeth to the point at which the teeth bend out of the second plane, and wherein the tooth radius is less than about 1.4 mm.

5. The end hook of claim 3, wherein the tooth angle is between about 80 degrees and about 100 degrees.

6. The end hook of claim 1, wherein a gap between the teeth is between about 3 mm and about 4 mm.

7. The end hook of claim 1, wherein a length of the stem portion is at least two times the engaging length.

8. The end hook of claim 1, wherein the measuring device is a chalk box and the end hook is operably coupled to the chalk box via a string.

9. An end hook for a measuring device, the end hook comprising:
   a stem portion extending in a first plane from a proximal end to a distal end, the end hook being operably coupled to the measuring device at the proximal end; and
   an engaging portion defined by a set of teeth having external lateral edges that define a hook width therebetween, the engaging portion extending away from the stem portion by an engaging length, wherein each of the teeth includes a portion thereof that extends away from the distal end of the stem portion in a second plane that is substantially perpendicular to the first plane,
wherein each of the teeth further includes a portion thereof, proximate to a distal end of the teeth, that bends out of the second plane to form an engaging angle,
wherein each of the teeth tapers to the distal end from a point at which the teeth bend out of the second plane to define a tooth angle between respective tapered edges, and
wherein a tooth radius is defined from an apex of the distal end of the teeth to the point at which the teeth bend out of the second plane,
wherein the hook width is in a range between about 16.5 mm and about 21 mm, and the tooth radius is less than about 1.4 mm, and
wherein the is about 45 degrees.

10. The end hook of claim 8, wherein the engaging length is greater than about 9 mm.

11. The end hook of claim 10, wherein the tooth angle is between about 80 degrees and about 100 degrees.

12. The end hook of claim 9, wherein a gap between the teeth is between about 3 mm and about 4 mm.

13. The end hook of claim 9, wherein a length of the stem portion is at least two times the engaging length.

14. The end hook of claim 9, wherein the measuring device is a chalk box and the end hook is operably coupled to the chalk box via a string.

15. A chalk box comprising:
a housing having an aperture;
a reel assembly enclosed within the housing;
a string having a first end operably coupled to an end hook and configured to extend from the housing through the aperture and having a second end configured to be wound on the reel assembly; and
a chalk reservoir in which the string is retained or through which the string passes prior to extending out of the aperture,
wherein the end hook comprises:
a stem portion extending in a first plane from a proximal end to a distal end, the end hook being operably coupled to the string at the proximal end; and
an engaging portion defined by a set of teeth having external lateral edges that define a hook width therebetween, the engaging portion extending away from the stem portion by an engaging length,
wherein each of the teeth includes a portion thereof that extends away from the distal end of the stem portion in a second plane that is substantially perpendicular to the first plane,
wherein each of the teeth further includes a portion thereof, proximate to a distal end of the teeth, that bends out of the second plane to form an engaging angle,
wherein each of the teeth tapers to the distal end from a point at which the teeth bend out of the second plane to define a tooth angle between respective tapered edges,
wherein a tooth radius is defined from an apex of the distal end of the teeth to the point at which the teeth bend out of the second plane, and
wherein the hook width is in a range between about 16.5 mm and about 21 mm, the engaging angle is about 45 degrees, and the tooth radius is less than about 1.4 mm.

16. The chalk box of claim 15, wherein the tooth angle is between about 80 degrees and about 100 degrees.

17. The chalk box of claim 15, wherein a gap between the teeth is between about 3 mm and about 4 mm.

18. The chalk box of claim 15, wherein a length of the stem portion is at least two times the engaging length.

* * * * *

UNITED STATES PATENT AND TRADEMARK OFFICE
CERTIFICATE OF CORRECTION

PATENT NO. : 12,241,497 B2
APPLICATION NO. : 17/618934
DATED : March 4, 2025
INVENTOR(S) : Cecil Wilson Page 1 of 1

It is certified that error appears in the above-identified patent and that said Letters Patent is hereby corrected as shown below:

In the Claims

In Column 9, Claim 9, Line 19, "wherein the" should read as -- wherein the engaging angle --

Signed and Sealed this
Tenth Day of June, 2025

Coke Morgan Stewart
*Acting Director of the United States Patent and Trademark Office*